United States Patent
Schulz

(10) Patent No.: US 11,285,897 B2
(45) Date of Patent: Mar. 29, 2022

(54) ARRANGEMENT OF A SENSOR COMPRISING A SENSOR-ACTIVE SURFACE ON AN OUTER ADD-ON PART OF A VEHICLE

(71) Applicant: Audi AG, Ingolstadt (DE)

(72) Inventor: Markus Schulz, Gaimersheim (DE)

(73) Assignee: Audi AG, Ingolstadt (DE)

(*) Notice: Subject to any disclaimer, the term of this patent is extended or adjusted under 35 U.S.C. 154(b) by 170 days.

(21) Appl. No.: 16/650,295

(22) PCT Filed: Jul. 2, 2018

(86) PCT No.: PCT/EP2018/067814
§ 371 (c)(1),
(2) Date: Mar. 24, 2020

(87) PCT Pub. No.: WO2019/063152
PCT Pub. Date: Apr. 4, 2019

(65) Prior Publication Data
US 2021/0107418 A1 Apr. 15, 2021

(30) Foreign Application Priority Data
Sep. 27, 2017 (DE) ...................... 10 2017 009 057.2

(51) Int. Cl.
*B60R 19/48* (2006.01)
*G01S 13/931* (2020.01)
*B60R 11/00* (2006.01)

(52) U.S. Cl.
CPC ............ *B60R 19/483* (2013.01); *B60R 11/00* (2013.01); *B60R 2011/004* (2013.01);
(Continued)

(58) Field of Classification Search
CPC . B60R 19/483; B60R 11/00; B60R 2011/004; B60R 2011/0047;
(Continued)

(56) References Cited

U.S. PATENT DOCUMENTS 9,348,014 B2    5/2016  Lee et al.
9,956,993 B1 *  5/2018  Klop ................ B60R 19/483
(Continued)

FOREIGN PATENT DOCUMENTS

DE  19816826 A1  10/1999
DE  19945075 A1   4/2000
(Continued)

OTHER PUBLICATIONS

International Preliminary Report on Patentability directed to related International Patent Application No. PCT/EP2018/067814 dated Mar. 31, 2020, with attached English-language translation; 12 pages.

(Continued)

*Primary Examiner* — Gregory A Blankenship
(74) *Attorney, Agent, or Firm* — Sterne, Kessler, Goldstein & Fox P.L.L.C.

(57) ABSTRACT

An arrangement for a sensor having a sensor-active surface on or behind an outer add-on part of a vehicle includes a sensor guide. The sensor guide is connected to the sensor and a first structural element of the vehicle such that the sensor moves in a vehicle longitudinal direction away from a sensor use position in response to an application of force against the sensor-active surface or the add-on part of the vehicle. The arrangement includes a spacer that limits the movement of the sensor to a maximum distance defined between the sensor use position and a second structural element of the vehicle, which is offset with respect to the first structural element in a direction along an interior of the (Continued)

vehicle. The arrangement includes a restoring element that moves the sensor back to the sensor use position.

9 Claims, 2 Drawing Sheets

(52) U.S. Cl.
CPC . *B60R 2011/008* (2013.01); *B60R 2011/0047* (2013.01); *G01S 2013/93275* (2020.01)

(58) Field of Classification Search
CPC ............. B60R 2011/008; G01S 13/931; G01S 2013/93271; G01S 2013/93275; B62D 25/08
See application file for complete search history.

(56) References Cited

U.S. PATENT DOCUMENTS

| | | | | |
|---|---|---|---|---|
| 2019/0161041 A1* | 5/2019 | Fernandez | ............ | G01S 13/931 |
| 2019/0162845 A1* | 5/2019 | Yasui | ................ | G01S 15/931 |
| 2019/0198986 A1* | 6/2019 | Singh | .............. | H01Q 1/3233 |
| 2020/0094759 A1* | 3/2020 | Tanabe | ................ | B60R 19/48 |
| 2021/0094494 A1* | 4/2021 | Carrillo Fernandez | | |
| | | | | B60R 19/483 |
| 2021/0291767 A1* | 9/2021 | Momii | ................ | B60R 19/483 |

FOREIGN PATENT DOCUMENTS

| | | | | |
|---|---|---|---|---|
| DE | 102007005322 A1 | 7/2008 | | |
| DE | 102009048173 A1 | 5/2010 | | |
| DE | 102013110444 A1 | 12/2014 | | |
| DE | 102015015476 B3 | 3/2017 | | |
| DE | 102017006273 | * 3/2019 | ........... | B60R 19/483 |
| DE | 102017009055 | * 3/2019 | ............. | G01S 7/027 |
| DE | 102019210776 | * 4/2021 | ........... | B60R 13/005 |
| FR | 3074760 | * 11/2020 | ........... | G01S 13/931 |

OTHER PUBLICATIONS

International Search Report and Written Opinion of the International Searching Authority directed to related International Patent Application No. PCT/EP2018/067814, dated Oct. 1, 2018, with attached English-language translation; 14 pages.

* cited by examiner

ARRANGEMENT OF A SENSOR COMPRISING A SENSOR-ACTIVE SURFACE ON AN OUTER ADD-ON PART OF A VEHICLE

TECHNICAL FIELD

The invention relates to an arrangement of a sensor comprising a sensor-active surface on or behind an outer add-on part of a vehicle.

BACKGROUND

Arrangements of sensors for driver assistance systems, emergency brake assistants, etc., which are installed on a vehicle front or a vehicle rear in the region of a bumper, are known from the prior art. Such sensors are, for example, proximity sensors, such as parking sensors or distance sensors and radars, night vision cameras, laser scanners, etc.

These sensors usually have an active sensor surface on the front and are installed, for example, in corresponding openings of the outer paneling of the bumper in such a way that the active sensor surface is flush with the outer paneling. Disadvantageously, such sensors, which are very expensive, can be damaged in so-called parking bumps during a parking operation, i.e. in the case of weak collisions, whereby high repair costs cannot be ruled out. Furthermore, there are legal requirements under certain conditions that prohibit the damage of certain sensors at parking bumps. This leads to installation positions that are unfavorable in terms of the sensor function and also have design disadvantages.

DE 10 2015 015 476 B3 describes a crash structure for a vehicle having a bumper and a sensor unit arranged on the bumper, wherein at least one deflector is arranged in the region between the sensor unit and an interior which, in an accident situation, influences a movement of the interior sensor unit entering in the direction of the vehicle interior. As a result, in an accident situation, the sensor unit is to be protected from damage or the severity of the damage is to be reduced.

According to DE 10 2013 110 444 A1, a radar device for a vehicle is described, which neither interferes with the exterior of a vehicle nor interferes with the laser beam emitted by a laser device and, moreover, is not damaged in a frontal collision. Such a radar apparatus includes a radar unit disposed on an inner side of a radiator grille of the vehicle, a multilayer transmission cover fitted in the radar unit and having a plurality of transmission layers formed on the front surface thereof through which a laser beam radiated from the radar unit passes, and a mounting portion including a connector body connecting the multi-layer transmission cover to the radar unit, the mounting portion being connected to the vehicle body.

SUMMARY OF INVENTION

The object of the invention is to provide an arrangement of a sensor on or behind an outer add-on part, for example on a bumper, so that in case of a weak collision with a low collision speed in the low speed range, the damage of such a sensor is prevented by reversing a displacement of the sensor that resulted from a weak collision, whereby the sensor remains functional.

This object is achieved by an arrangement having the features of claim 1.

Arrangement of a sensor comprising a sensor-active surface on an outer add-on part of a vehicle is designed with a sensor guide, by means of which the sensor is connected to a first structural element of the vehicle such that it can pivot in the vehicle longitudinal direction, a spacer, by means of which the movement of the sensor in the vehicle longitudinal direction is limited to a maximum distance, corresponding to the position of use of the sensor, from a second structural element of the vehicle, which is offset in relation to the first structural element in the direction of the vehicle interior, and a restoring element, which is adapted to move the sensor that was moved due to an external force generated by a collision in a low-speed region in the direction of the vehicle interior back to the position of use.

In case of a weak collision, i.e. in the low-speed range of less than 5 km/h, a collision force acts directly or indirectly on the sensor or directly on the outer add-on part and causes a displacement of the sensor in the direction of the vehicle interior, without damaging said sensor. This displacement is made possible by the fact that the sensor is pivotably connected by means of a sensor guide with a first structural element, preferably a bumper cross member in the vehicle longitudinal direction. After the collision, i.e. when the external force no longer acts on the sensor or the outer add-on part, the sensor is returned by the restoring element to its original position, i.e. to the position of use, whereby said sensor remains fully functional.

The additional connection of the sensor to a second structural element designed as a mounting bracket or lock support by means of a spacer ensures that the sensor is moved back exactly to its original position, namely the position of use, regardless of whether the first structural element is deformed by the collision or not. This means that the sensor is displaced back into this position of use by means of the restoring element even if the first structural element is slightly deformed by the weak collision and slightly displaced in the direction of the vehicle interior, since the second structural element is offset from the first structural element direction of the vehicle interior and therefore not deformed in such weak collisions. Thus, it is ensured by the spacer that, regardless of the state of the first structural element produced by the collision, the sensor is moved back into its position of use from the shifted position.

According to an advantageous development of the invention, the spacer is designed as a traction band by means of which the sensor is connected to the second structural element of the vehicle in such a way that the length of the traction band determines the position of use of the sensor. Such a realization of the spacer is structurally easy to implement.

Another preferred embodiment of the invention provides that the spacer is designed as a distance-variable connection of the sensor to the traction rod producing the second structural element, the traction rod has a latching means which is designed having the second structural element or having the sensor to establish a distance-fixing connection in the position of use of the sensor.

Such a traction rod having latching means represents a functionally reliable realization of the spacer.

Preferably, in this realization of the spacer it is provided that the traction rod is connected at one end to the sensor, and the traction rod is connected at the other end by means of the latching means to the second structural element, such that the latching means engages with the second structural element in the position of use of the sensor.

Furthermore, it is particularly advantageous if, according to a further development, the spacer is designed having an adjusting element for adjusting the distance between the sensor in the position of use and the second structural element.

According to a further embodiment of the invention, it is provided that the sensor guide is designed as a joint kinematics,
the sensor is connected via linkage parts of the joint kinematics with the first structural element of the vehicle, wherein with the displacement of the sensor from the position of use, the linkage parts are pivotable, and
the restoring element, as an element generating a restoring force, is connected on the one hand to the first structural element and on the other hand to a linkage part or to the sensor, wherein with the displacement of the sensor from the position of use a restoring force can be generated returning the sensor to the position of use by means of the element.

BRIEF DESCRIPTION OF THE FIGURES

Further advantages, features and details of the invention will become apparent from the claims, the following description of preferred embodiments and from the drawings, in which:

DETAILED DESCRIPTION OF THE FIGURES

Figure 1:
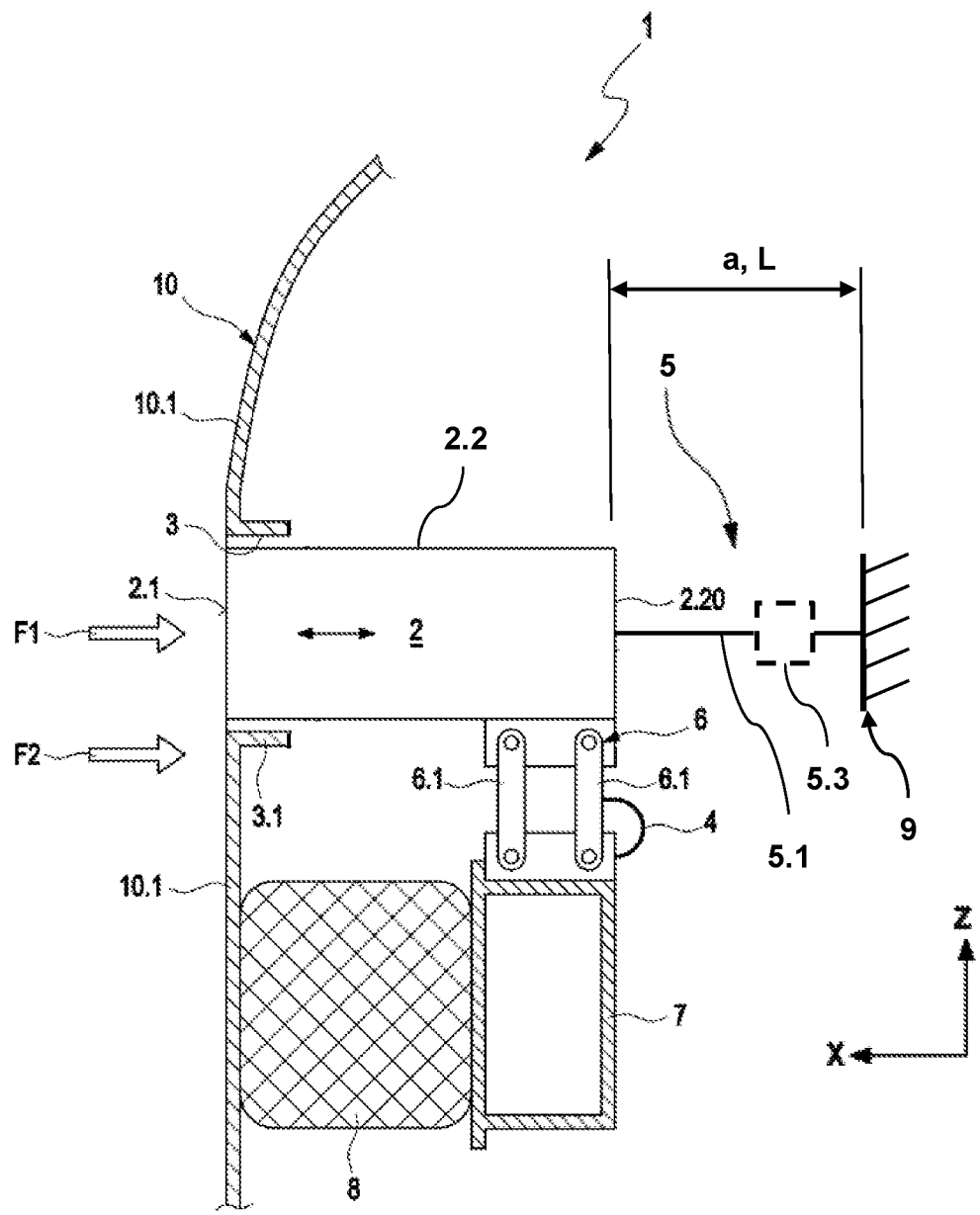
FIG. 1 shows a schematic representation of the arrangement according to a first embodiment of the invention.
Figure 2:
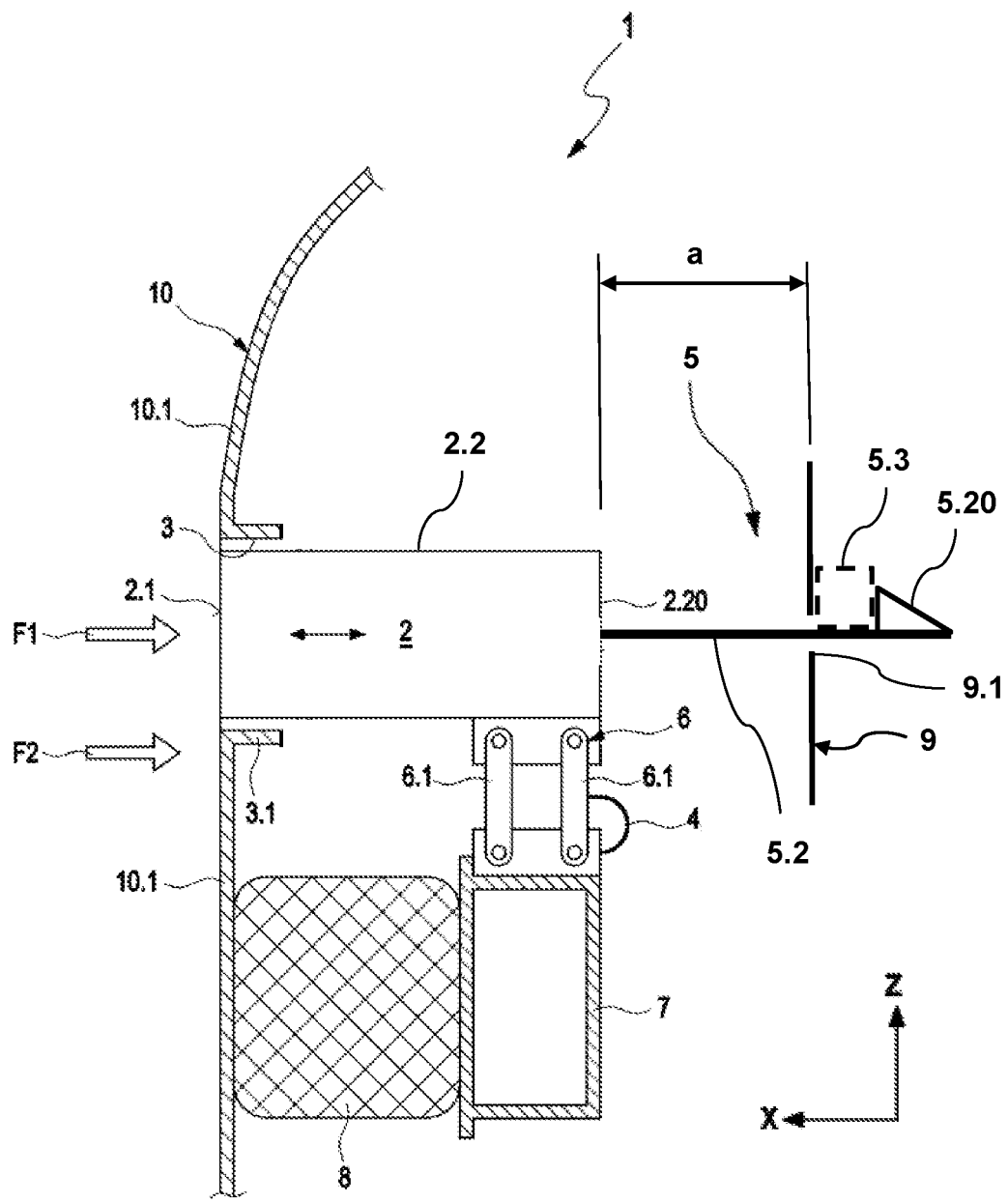
FIG. 2 shows a schematic representation of the arrangement according to a second embodiment of the invention.

The exemplary embodiments of the arrangement 1 according to the invention are described according to FIGS. 1 and 2 by way of example on a front-side bumper as outer add-on part 10 of a vehicle. This outer add-on part 10 has a vehicle outer skin 10.1, which can also be realized as a radiator grille or as a bumper cover.

According to FIGS. 1 and 2, a sensor 2 of the arrangement 1, said sensor being designed as a laser scanner, for example, is mounted in a sensor opening 3 of the vehicle outer skin 10.1 by means of a sensor guide 6 designed as a joint kinematics. The sensor opening 3 is closed by an active sensor surface 2.1 of the sensor 2, said surface being flush with the vehicle outer skin 10.1 surrounding the sensor opening 3.

Alternatively to the surface flushing of the active sensor surface 2.1 of the sensor 2 with the sensor opening 3, the sensor 2 can also be located behind a vehicle outer skin 10.1 (with or without distance therefrom and with or without a sensor opening 3) or can be brought forward or shifted back in relation to a larger sensor opening in the vehicle outer skin.

The sensor opening 3 comprises a peripheral wall 3.1 forming the sensor opening 3. The inner peripheral surface of the peripheral wall 3.1 is adapted to the outer contour of a housing 2.2 of the sensor 2 such that the sensor 2 is displaceable from the use position in the vehicle longitudinal direction.

The displaceability of the sensor 2 and thus also the mounting of the sensor 2 in the position of use thereof is realized by means of a sensor guide 6 designed as a joint kinematics. This kinematic system 6 comprises rod elements 6.1 with at least two struts which connect the sensor 2 at the end opposite the sensor surface 2.1 with a first structural element 7 configured as a bumper crossmember and arranged in the vehicle vertical direction (z-direction) below the sensor 2, so that with a displacement of the sensor 2 from the use position corresponding to the representation according to FIGS. 1 and 2, the linkage parts 6.1 are pivoted relative to the first structural element 7 designed as a mounting support or lock support.

Furthermore, this arrangement 1 according to FIGS. 1 and 2 comprises a restoring element 4 configured as a spring element, which is connected on the one hand to the first structural element 7 and on the other hand either to a strut of the linkage parts 6.1 or to a housing 2.2 of the sensor 2. Thus, a restoring force is generated by the spring element, when the linkage parts 6.1 are pivoted according to the displacement of the sensor 2 from its position of use in the direction of the vehicle interior (x-direction).

Between the first structural element 7 designed as a bumper cross member and the vehicle outer skin 10.1, a pedestrian protection deformation element 8 is arranged.

The position of use of the sensor 2 according to FIGS. 1 and 2 is given by the distance a from the rear 2.20 thereof to a second structural element 9 and is determined by a spacer 5. According to FIG. 1, the spacer 5 is designed as a traction band 5.1, and according to FIG. 2, the spacer 5 is designed as a traction rod 5.2 having a latching means 5.20. The second structural element 9 is offset from the first structural element 7 in the direction of the vehicle interior, so that it is not deformed in the event of a weak collision in the low-speed range.

According to FIG. 1, the traction band 5.1 connects the rear 2.20 of the sensor 2 to the second structural element 9 of the vehicle. In the position of use of the sensor 2 according to FIG. 1, the traction band 5.1 is stretched and has a length L which determines the distance a of the rear 2.20 of the sensor 2 to the second structural element 9 of the vehicle. By means of an adjusting element 5.3 integrated into the traction band 5.1, the length L of the traction band 5.1 can be set prior to a vehicle delivery at the factory of the vehicle manufacturer or during a vehicle maintenance.

The spacer 5 according to FIG. 2 is implemented instead of the traction band 5.1, according to FIG. 1, having a traction rod 5.2 extending in the vehicle longitudinal direction, wherein said traction rod is fastened with the front end thereof to the rear 2.20 of the sensor 2 and is designed at the opposite end having a latching means 5.20. This traction rod 5.2 passes through an opening 9.1 arranged, for example, in a support wall of a second structural element 9 of the vehicle, wherein the nose-like latching means 5.20 engages behind the border of the opening 9.1 and thus determines the distance a between the rear 2.20 of the sensor 2 and the second structural element 9. According to FIG. 2, the nose-like latching means 5.20 does not abut directly on the second structural element, but rather on an adjusting element 5.3, which can be additionally provided and serves to define the distance a defining the position of use of the sensor 2 between the rear 2.20 of the sensor 2 and the second structural element 9 of the vehicle before a vehicle delivery at the factory of the vehicle manufacturer or during a vehicle maintenance.

In a weak collision of the vehicle with another vehicle, person, or object in the direction of the vehicle interior, i.e. in the vehicle longitudinal direction against the x-direction, a force F1 acts directly on the active sensor surface 2.1 of the sensor 2 or a force F2 on the vehicle outer skin 10.1 in the area of the sensor opening 3. A weak collision is a collision in the low-speed range, for example, at a vehicle speed of less than 5 km/h.

By the forces F1 or F2, the sensor 2 is displaced from its operating position towards the direction of the vehicle interior, either directly or by means of the pedestrian protection deformation element 8 and by means of the first structural element 7 according to FIGS. 1 and 2, wherein in the case of the generated collision force F2, the first structural element 7 becomes permanently deformed. However, the second structural element 9, to which the traction band 5.1 is fastened or which is designed having the opening 9.1 for guiding the traction rod 5.2, has the property that it remains undeformed in such weak collisions in the low-speed range.

This movement of the sensor 2 from the position of use thereof in the direction of the vehicle interior is made possible by means of the sensor guide 6 designed as a joint kinematics. Due to the elastic property of the vehicle outer skin 10.1, said skin returns back to the original shape thereof after the end of the load by the force F1 or F2.

According to FIG. 1, the sensor 2 is moved back in the in the direction of use by the restoring element 4 acting on the sensor 2 or the sensor guide 6, until the traction band 5.1 is stretched and thus the sensor 2 is spaced with a distance a, which is characteristic for the position of use thereof, from the undeformed second structural element 9 of the vehicle. Thus, the sensor 2 has reached its position of use and is ready for operation again after the collision.

The length L of the traction band 5.1 predetermines the possible return trajectory of the sensor 2 and is thus independent of the position of the optionally slightly deformed first structural element 7 designed as a bumper cross member.

According to FIG. 2, with the movement of the sensor 2 in the direction of the vehicle interior, the traction rod 5.2 is pushed through the opening 9.1 in the direction of the vehicle interior. Due to the elastic property of the vehicle outer skin 10.1, said skin returns back to the original shape thereof after the end of the load by the force F1 or F2. By the restoring element 4 acting on the sensor 2 or on the joint kinematics 6, the sensor 2 is moved back in the direction of the position of use until the nose-like latching means 5.20 engages behind the edge of the opening 9.1 and the adjusting element 5.3, and thus the sensor 2 is spaced with a distance a, which is characteristic for the position of use thereof, from the undeformed second structural element 9 of the vehicle. Thus, the sensor 2 has reached its position of use and is ready for operation again after the collision. The limitation of the return trajectory takes place in a form-fitting manner between the nose-like latching means 5.20 of the traction rod 5.2 and the undeformed second structural element 9 of the vehicle and is thus independent of the position of the first structural element 7 which is optionally slightly deformed and is designed as a bumper cross member.

For allowing the pivoting movement of the sensor 2 from its collision position back to the use position by means of the articulated kinematics sensor guide 6, even when the first structural element 7 is deformed in the direction of the vehicle interior, the joint kinematics is designed such that a pivoting of the sensor 2 relative to the first structural element 7 is possible in both the front and in the rear direction of the vehicle. In addition, sufficient clearance is provided between the peripheral wall 3.1 of the sensor opening 3 and the outer contour of the sensor housing 2.2, so that during a pivotal movement of the sensor 2 relative to the first structural element 7, a compensating movement in the vehicle vertical direction (z-direction) can take place.

The sensor guide 6 designed as a joint kinematics according to FIGS. 1 and 2 can also be carried out such that the connection of the linkage parts 6.1 to the sensor 2 is designed to be rigid and only the connection to the structural element 7 is designed like a joint. In this case, the two existing axes of rotation of the linkage parts 6.1 are to be combined on the structural element 7 of the vehicle to form an axis of rotation, such that the total composite of sensor 2 and linkage parts 6.1 pivots only about this one axis of rotation. Thus, the sensor 2 does not perform a translational movement but rather a rotational movement upon a displacement from the position of use thereof, contrary to the embodiments of FIGS. 1 and 2.

REFERENCE NUMERALS

1 arrangement
2 sensor
2.1 sensor-active surface of the sensor 2
2.2 housing of the sensor 2
2.20 rear of the sensor 2
3 sensor opening
3.1 peripheral wall of the sensor opening 3
4 restoring element
5 spacer
5.1 traction band
5.2 traction rod
5.20 latching means
5.3 adjusting element
6 sensor guide
6.1 linkage parts
7 first structural element
8 pedestrian protection deformation element
9 second structural element
10 outer add-on part of a vehicle
10.1 vehicle outer skin

The invention claimed is:

1. An arrangement for a sensor comprising a sensor-active surface on or behind an outer add-on part of a vehicle, comprising:
    a sensor guide connected to the sensor and a first structural element of the vehicle, wherein the sensor guide is configured to pivot about the first structural element such that the sensor moves in a vehicle longitudinal direction away from a sensor use position in response to an application of force against the sensor-active surface or the outer add-on part of the vehicle;
    a spacer configured to limit a movement of the sensor in the vehicle longitudinal direction to a maximum distance defined between the sensor use position and a second structural element of the vehicle, wherein the second structural element is offset with respect to the first structural element in a direction along an interior of the vehicle; and
    a restoring element configured to move the sensor back to the sensor use position after the sensor has moved away from the sensor use position in the vehicle longitudinal direction.

2. The arrangement according to claim 1, wherein the spacer comprises a traction band connected to the sensor and the second structural element of the vehicle such that a length of the traction band defines the maximum distance between the sensor use position and the second structural element.

3. The arrangement according to claim 1, wherein the spacer comprises a traction rod connected to the sensor, the traction rod configured to vary the distance defined between the sensor and the second structural element, and wherein the traction rod includes a latch coupled to the second structural element or the sensor, the latch being configured to set the sensor at the sensor use position.

4. The arrangement according to claim 3, wherein the traction rod includes a first end connected to the sensor and a second end connected to the second structural element by the latch, such that the latch engages the second structural element to set the sensor at the sensor use position.

5. The arrangement according to claim 1, wherein the spacer comprises an adjusting element configured to adjust the maximum distance defined between the sensor use position and the second structural element.

6. The arrangement according to claim 1, wherein the sensor guide is a joint kinematic comprising linkage parts connected to the sensor and the first structural element of the vehicle, wherein the linkage parts are pivotable about the first structural element to displace the sensor from the sensor use position and move the sensor back to the sensor use position, and wherein the restoring element is connected to the first structural element and to the linkage parts or the sensor, the restoring element being configured to apply a restoring force against the linkage parts as the sensor is displaced from the sensor use position such that the linkage parts move the sensor back to the sensor use position.

7. The arrangement according to claim 1, wherein the first structural element comprises a bumper cross member.

8. The arrangement according to claim 1, wherein the second structural element comprises a mounting bracket.

9. The arrangement according to claim 1, wherein the second structural element comprises a lock support.

\* \* \* \* \*